(12) United States Patent
Laskin et al.

(10) Patent No.: US 11,733,534 B2
(45) Date of Patent: Aug. 22, 2023

(54) OPTICS FOR FORMATION OF MULTIPLE LIGHT SPOTS WITH CONTROLLED SPOT INTENSITY AND VARIABLE SPOT PATTERN GEOMETRY

(71) Applicant: AdlOptica Optical Systems GmbH, Berlin (DE)

(72) Inventors: Alexander Laskin, Berlin (DE); Vadim Laskin, Berlin (DE)

(73) Assignee: ADLOPTICA OPTICAL SYSTEMS GMBH, Berlin (DE)

( * ) Notice: Subject to any disclaimer, the term of this patent is extended or adjusted under 35 U.S.C. 154(b) by 360 days.

(21) Appl. No.: 17/154,603

(22) Filed: Jan. 21, 2021

(65) Prior Publication Data

US 2022/0229309 A1 Jul. 21, 2022

(51) Int. Cl.
*G02B 27/28* (2006.01)
*G02B 26/08* (2006.01)
(Continued)

(52) U.S. Cl.
CPC ....... *G02B 27/283* (2013.01); *G02B 26/0816* (2013.01); *G02B 26/0875* (2013.01);
(Continued)

(58) Field of Classification Search
CPC .. G02B 27/283; G02B 27/126; G02B 27/281; G02B 26/0816; G02B 26/0875; G02B 26/10
(Continued)

(56) References Cited

U.S. PATENT DOCUMENTS

| 1,926,716 A | 9/1933 | Ehringhaus |
| 3,438,692 A | 4/1969 | Tabor |

(Continued)

FOREIGN PATENT DOCUMENTS

| WO | 2015107044 A1 | 7/2015 |
| WO | 2016150425 A1 | 9/2016 |

OTHER PUBLICATIONS

Collett, E., Field Guide to Polarization, SPIE, Bellingham, Washington, 2012, pp. 1-134.

(Continued)

*Primary Examiner* — Joseph P Martinez
*Assistant Examiner* — Mitchell T Oestreich
(74) *Attorney, Agent, or Firm* — Brian S. Steinberger; Hilary F. Steinberger; Law Offices of Brian S. Steinberger, P.A.

(57) ABSTRACT

Systems, devices, apparatuses and methods for formation of multiple separate light spots with adjustable intensity due to lossless redistribution of the light energy between the separate spots, and with a variable geometry of the multi-spot pattern; advantageously, for laser processing of materials by focusing the laser radiation on a workpiece. The multi-spot pattern is created due to angular polarization splitting of the light beam into several beamlets using a beam splitter and further focusing these beamlets onto a workpiece by a focusing optical system, advantageously by the scanning focusing optics. The beam splitter can include optical birefringent prisms, prism groups and waveplates capable to operate simultaneously at two different wavelengths. Some of these optical elements are rotatable, and their rotations are used for lossless redistribution of light energy between the spots and for a change in the geometric shape of the multi-spot patterns. Embodiments can provide various geometrical configurations of 2, 3, 4, 9 and more separate (Continued)

focused spots: linear, rhombus-shaped, square, parallelogram, rectangular patterns composed in the form of a line or a matrix, with the ability to vary portions of the light energy at the specified separate spots.

20 Claims, 5 Drawing Sheets

(51) Int. Cl.
*G02B 26/10* (2006.01)
*G02B 27/12* (2006.01)

(52) U.S. Cl.
CPC .......... *G02B 26/10* (2013.01); *G02B 27/126* (2013.01); *G02B 27/281* (2013.01)

(58) Field of Classification Search
USPC .................................................. 359/485.06
See application file for complete search history.

(56) References Cited

U.S. PATENT DOCUMENTS

| | | |
|---|---|---|
| 4,689,482 A | 8/1987 | Horikawa et al. |
| 4,691,093 A | 9/1987 | Banas et al. |
| 5,124,841 A | 6/1992 | Oishi |
| 5,299,059 A | 3/1994 | Oikawa |
| 5,327,270 A | 7/1994 | Miyatake |
| 5,430,816 A | 7/1995 | Furuya |
| 5,690,845 A | 11/1997 | Fuse |
| 5,716,122 A | 2/1998 | Esaki et al. |
| 6,661,577 B1 | 12/2003 | Wu et al. |
| 7,006,287 B2 | 2/2006 | Chen et al. |
| 7,167,311 B2 | 1/2007 | Brasen et al. |
| 7,360,899 B2 | 4/2008 | McGuire, Jr. et al. |
| 7,961,392 B2 | 6/2011 | Maeda et al. |
| 10,663,849 B2 * | 5/2020 | Maeda ............... G02B 27/0972 |
| 2002/0181824 A1 | 12/2002 | Huang et al. |
| 2006/0198022 A1 | 9/2006 | Pan et al. |
| 2009/0230099 A1 | 9/2009 | Aalto et al. |

OTHER PUBLICATIONS

Collett, E., Field Guide to Polarization, SPIE, Bellingham, Washington, 2012, p. 41.
Born, M. and Wolf, E., Principles of Optics, 7th edn., Cambridge University Press, Cambridge, 1999, pp. 678-690.

* cited by examiner

OPTICS FOR FORMATION OF MULTIPLE LIGHT SPOTS WITH CONTROLLED SPOT INTENSITY AND VARIABLE SPOT PATTERN GEOMETRY

FIELD OF INVENTION

The present invention relates to the field of optics, and more particular to methods, apparatuses, devices and systems for laser material processing, such as welding, cladding, cutting, drilling, various techniques of micromachining, and in particular, for parallel processing or for optimizing process conditions due to sharing the laser energy between several process spots, arranged in different patterns using multi-spot optics.

BACKGROUND TO THE INVENTION

Lasers are widely used in various industrial material processing technologies due to their ability to provide a high concentration of energy in the spot when focusing the laser beam.

Physical effects arising from the interaction of material and concentrated laser energy can lead to some necessary processing effects, such as melting and evaporation of metals in laser welding, cladding, Selective Laser Melting (SLM) or cutting applications.

Another widely used processing technique is material ablation in various micromachining applications such as drilling printed circuit boards (PCB), patterning and scribing in photovoltaics. The power of modern lasers has reached a high level and continues to grow, and there is an important industrial task to convert the growth of laser power into an increase in the productivity of technological processes.

One of the effective methods for increasing the productivity of the technological process is splitting a laser beam into parts and focusing at multiple process spots. This allows, for example, parallel processing in micromachining or optimization of the dynamic temperature profile in the melting pool to reduce porosity and spatter in welding or cladding using multi-kW lasers.

Methods and devices of spatial splitting of a laser beam using multi-faceted optical elements, such as mirrors or lenses, as well as using multi-lens arrays are described in U.S. Pat. No. 5,430,816 to Furuya, U.S. Pat. No. 5,690,845 to Fuse, U.S. Pat. No. 4,691,093 to Banas et al., U.S. Patent Application No. 2009/0230099A1 to Aalto et al., and WO/2016/150425A1 to Walter all incorporated by reference.

Common disadvantages of these technical solutions using multi-faceted optical elements include the complexity of manufacturing and adjustment of multifaceted optical elements, the low resistance to modern multi-kW continuous wave (CW) and powerful ultra-short pulse (USP) lasers, as well as the poor suitability of systems to redistribution of energy between separate spots and varying the spot patterns geometry.

Another beam splitting technique is based on the use of Holographic Optical Elements (HOE) or Diffractive Optical Elements (DOE).

Implementation examples of these techniques are described in WO/2015/107044 A1 to Eifel et al., and U.S. Pat. No. 4,689,482 to Horikawa et al., all incorporated by reference.

Disadvantages of DOE-based optical systems include high initial manufacturing costs; limited efficiency and low resistance to high-power laser radiation, especially to widely-used ultra-short pulse lasers and multi-kW, continuous wave and pulse lasers. Additional disadvantages include lack of flexibility in sharing the laser energy portions in separate spots and in varying geometry of spots pattern, high sensitivity of DOE performance to deviations of input beam size, intensity profile and mode structure, as well as to misalignments.

DOE-based optical systems can be efficiently used only with single-mode ($TEM_{00}$) lasers. DOE exhibit low efficiency with multimode lasers, which are widely used in modern industry.

Other methods and devices involve the use of optical prisms or wedges made of birefringent optical materials to implement polarization beam splitting or beam combining.

Technical solutions realizing the splitting technique are in U.S. Pat. No. 3,438,692 to Tabor, U.S. Pat. No. 5,124,841 to Oishi, U.S. Pat. No. 5,299,059 Oikawa, U.S. Pat. No. 5,327,270 to Miyatake, U.S. Pat. No. 5,716,122 to Esaki et al., U.S. Pat. No. 6,661,577 to Wu et al., U.S. Pat. No. 7,006,287 to Chen et al., U.S. Pat. No. 7,167,311 to Brasen et al., U.S. Pat. No. 7,360,899 to McGuire et al., U.S. Pat. No. 10,663,849 to Maeda, U.S. Patent Application No. 2002/0181824A1 to Huang et al., No. 2006/0198022A1 to Pan et al., all incorporated by reference.

Although these methods solve the task of splitting the light beam, and some solutions are suitable for operation with high-power lasers, these methods do not provide the flexibility of light beam shaping required in modern laser technologies. These methods further do not provide for a controlled change in the energy distribution between separate process spots, nor variable geometry of spot patterns, nor realization of the same beam splitting effect simultaneously at two different wavelengths.

From the point of view of modern requirements to laser material processing, the conventional methods are not optimal.

As such, efficient affordable methods, apparatus and systems are needed that can provide: lossless light beam splitting for the subsequent creation of separate process spots by focusing the split up beams, controlled redistribution of the light energy between separate process spots, controlled changeover of the geometry of spots patterns, adaptation for simultaneous operation with different lasers with different wavelengths, mode structures, powers, pulse durations and pulse energies, as well as insensitivity to misalignments.

Thus, the need exists for solutions to the above problems with the prior art.

SUMMARY OF THE INVENTION

A primary objective of the present invention is to provide systems, devices, apparatus and methods for formation of multiple separate light spots with control of intensity of the said separate spots by lossless redistributing the energy of the incoming light beam, and with variable geometry of the multi-spot pattern, advantageously for laser processing of materials by focusing the laser radiation on a workpiece.

This technical task is solved by obtaining a collimated or low divergent light beam using a collimator or a beam-expander, angular polarization splitting of the said light beam into several beamlets using a beam splitter and subsequent focusing these beamlets onto a workpiece using a focusing optical system.

The optical system of the specified beam splitter built using optical prisms, prism groups and waveplates, and contains at least one birefringent wedge-shaped prism made of a crystalline material and implemented in such a way that the optical axis of the crystal of each said prism forms an angle with the ridgeline of its refractive surfaces, this angle ranges from 0° to approximately 90°.

In addition, the said beam splitter can include one or more dual waveplates implementing the phase front retardation effect simultaneously at two operating wavelengths; this distinctive feature makes the beam splitter optical system suitable for switching between different laser sources or simultaneously operating with them, for example, with a high power multimode fiber-coupled Yb:YAG solid-state laser with wavelength 1030 nm and an Yb fiber laser with wavelength 1070 nm for welding.

Advantageously, but not limited to, the light sources are high power continuous wave (CW) or ultra-short pulse (USP) lasers; in the case of a fiber laser or a fiber-coupled laser with significantly diverging light, the specified collimated or low divergent beams are provided by an optical collimator; in the case of a free space laser, characterized by a beam of minimal divergence, either this beam itself, or the beam expanded by the beam expander, is directed to the input of the said beam splitter.

A secondary objective of the present invention is to provide systems, devices, apparatus and methods for formation of multiple separate light spots, wherein the optical elements of the beam splitter, the birefringent wedge-shaped prisms and dual waveplates, are air-spaced.

This air-spaced feature makes the systems according to the present invention highly resistant to radiation of high power CW and USP laser, which ensures reliable operation.

An important advantage of the technical solution of the present invention is that these optical elements have only flat refractive optical surfaces; this makes the beam splitter insensitive to misalignments, such as lateral displacements and tilts, and enables easy installation and reliable operation of devices built in accordance with the present invention.

A third objective of the present invention is to provide systems, devices, apparatus and methods for formation of multiple separate light spots with control of intensity of each separate spot, wherein the beam splitter comprises one or more dual waveplates realizing simultaneously at two operating wavelengths $\lambda_1$ and $\lambda_2$ either the half-wave, or the quarter-wave phase front retardation effects. One more implementation of the dual waveplate assumes simultaneously the quarter-wave phase front retardation at one operating wavelength $\lambda_1$ and the half-wave phase front retardation effect at another operating wavelength $\lambda_2$. Depending on the operation conditions in a particular application, the specified dual waveplate is implemented either as a multi-order waveplate or as a zero- or low-order waveplate presenting a combination of two multi-order waveplates.

A fourth objective of the present invention is to provide systems, devices, apparatus and methods for formation of multiple separate light spots in such a way that intensity of each separate spot is controlled by rotating one or more dual waveplates of the beam splitter.

This rotation feature results in change in the polarization state of the light passing through the dual waveplate, and therefore in a change in the energy portions in the beamlets when the light beam is split up by the wedge-shaped prisms or prism groups.

An important advantage of this distinctive feature is that the energy redistribution between spots is lossless. Some implementations of the systems according to the present invention contemplate that the beam splitter comprises prism groups with birefringent wedge-shaped prisms and rotatable dual waveplates located between these birefringent wedge-shaped prisms; this allows making compact, easy-to-manufacture and easy-to-use devices.

A fifth objective of the present invention is to provide systems, devices, apparatus and methods for formation of multiple separate light spots in such a way that the beam splitter comprises at least one rotatable birefringent wedge-shaped prism or a prism group, and the rotation of this prism or prism group is used to change and control the geometry of the multiple spots patterns in the working field.

According to various implementations of the systems of the present invention, the settings of the rotatable dual waveplate or dual waveplates, as well as of the rotatable wedge-shaped prism or prism group can be chosen to provide:
 a linear multi-spot pattern: two or more spots of variable intensity lined up in a row,
 a square-shaped multi-spot pattern: four spots of even or variable intensity, which centers coincide with the vertices of a square,
 a rhombus-shaped multi-spot pattern: four spots of even or variable intensity, which centers coincide with the vertices of a rhombus,
 a square-shaped matrix with more than four spots of even or variable intensity, for example nine-spot matrix 3×3,
 a rhombus-shaped matrix with more than four spots of even or variable intensity, for example seven-spot or nine-spot matrix.

When one of the aforementioned multiple spots patterns is set, and the settings of the rotatable wedge-shaped prisms or prism groups are fixed, the rotation of the rotatable dual waveplate or dual waveplates leads to the lossless redistribution of energy portions between the split up beamlets and, as result, to adjustable and controlled intensity of separate spots in the working field.

A sixth objective of the present invention is to provide systems, devices, apparatus and methods for formation of multiple separate light spots in such a way that the beam splitter comprises a wedge-shaped prism made of isotropic refractive optical material.

The function of the isotropic refractive optical material is to correct the orientation of the split up beamlets to minimize deviation of the multi-spot pattern from the optical axis of the apparatus. This orientation correction allows making compact optical systems that can be easily integrated into industrial equipment.

A seventh objective of the present invention is to provide systems, devices, apparatus and methods for formation of multiple separate light spots by focusing the beamlets split up by the beam splitter into a working field using a focusing optical system that is implemented as an objective or as a scanning optical system comprising a mirror-based scanner and a scanning lens, such as advantageously the F-theta lens.

Embodiments of the systems, devices, apparatus and methods for formation of multiple separate light spots are described.

One skilled in the relevant art will recognize, however, that the invention can be practiced without one or more of the specific details, or with other methods, components, materials, etc. In other words, well-known structures, materials, or operations are not shown or described in detail to avoid obscuring aspects of the invention.

Further objects and advantages of this invention will be apparent from the following detailed description of the presently preferred embodiments which are illustrated schematically in the accompanying drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

The invention is illustrated, without limitation, by the accompanying drawings showing schematic diagrams, ray trace of principal rays of split up beamlets and characteristic multi-spot patterns in the form of measurements of intensity distributions using a beam profiler in the working field of real optical devices implemented according to the present invention. The drawings are briefly described below.

DETAILED DESCRIPTION OF THE PREFERRED EMBODIMENTS

Figure 1A:
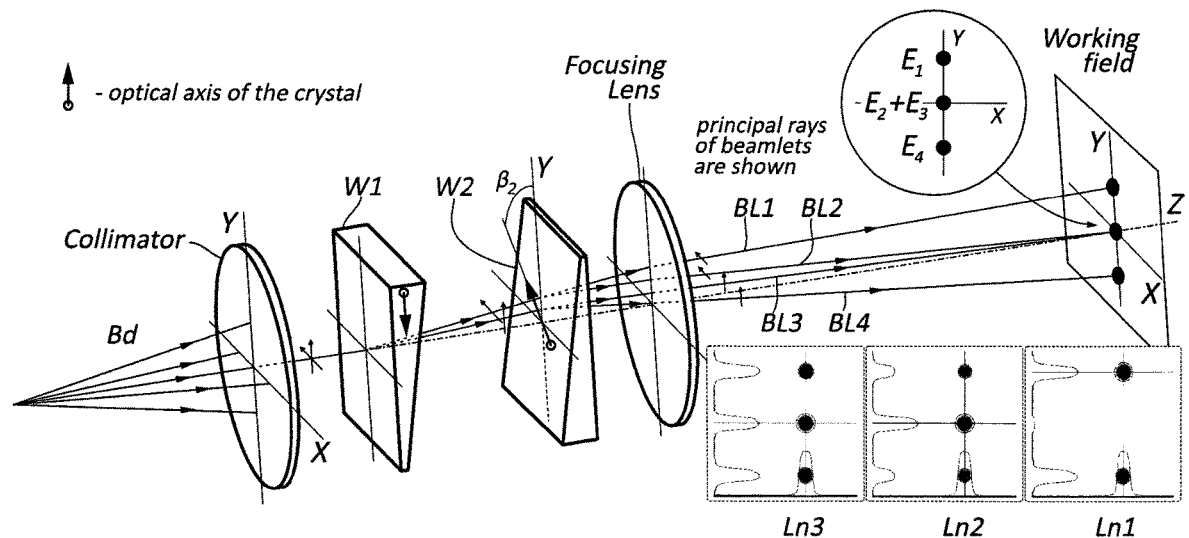
FIG. 1A is a schematic diagram with a beam splitter in form of two birefringent wedge-shaped prisms implemented according to the present invention, providing a linear multi-spot pattern: two or three spots lined up in a row.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of the Preferred Embodiments and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure can be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Figures and the various embodiments used to describe the principles of the present invention are by way of illustration and should not be construed in any way to limit the scope of the invention. Those skilled in the art will understand that the principles of the present invention can be implemented in a variety of laser devices.

The following list of symbols and reference numerals is used in the description and the drawings to identify components:

X horizontal axis
Y vertical axis
Z optical axis of the apparatus
Bd divergent light beam
Bc collimated light beam, characterized by minimized divergence
W1-W11 prisms made of birefringent material according to the present invention
PG1-PG4 prism groups
D1-D6 dual waveplates according to the present invention
BL1-BL4 principal rays of beamlets after splitting up, called also "chief rays"
Ln1-Ln6 line-shaped multi-spot patterns, as measurements of intensity distributions using a beam profiler
Rb1-Rb3 rhombic multi-spot patterns, as measurements of intensity distributions using a beam profiler
Sq1-Sq3 square-shaped multi-spot patterns, as measurements of intensity distributions using a beam profiler
Md1-Mt3 3×3 matrix multi-spot patterns, as measurements of intensity distributions using a beam profiler
$E_1$-$E_4$ portions of energy in separate spots According to the present invention, various optical devices for laser material processing are implemented by focusing laser radiation using an optical system that simultaneously forms several focused spots perpendicular to the optical axis in a working field or on a workpiece, with the ability to vary the energy distribution between these spots. This is a versatile lossless beam shaping method that is used with the same efficiency with lasers of any $M^2$ or BPP (Beam Parameter Product), with beams of any size within clear aperture of the optics, with light of spectrum spanning from deep ultraviolet to mid-wave infrared.

Flexibility in the implementation of various geometrical spot patterns with variable intensity distribution makes it possible to optimize and control the temperature distribution in the working field or in the melting pool, which is important in welding, cladding, brazing, 3D-printing (three-dimensional printing) technologies such as Selective Laser Melting. This control of temperature distribution makes it possible to reduce or eliminate unwished spattering and porosity, to stabilize the laser processing technologies and improve process reliability. Another important function of multi-spot optics is the implementation of parallel processing, which is an actual technical task in modern micromachining technologies, such as scribing, drilling and patterning. With the continuous growth of power of modern continuous wave and pulse lasers, the parallel processing allows the increase in laser power to be converted into increased process productivity.

According to the present invention, light is generated by a light source, advantageously by a laser, and components of the multi-spot optics are:
- an optical device that provides a collimated light beam of minimized divergence; for instance, a collimator of a fiber laser, or a beam-expander in the case of a free-space laser, characterized by the small beam divergence;
- a beam splitter—an optical device for lossless polarization splitting the collimated light beam into several beamlets, comprising birefringent prisms and waveplates, these optical components are fixed or rotated to provide various geometric patterns of spots formed by further focusing, as well as variable lossless energy sharing between these spots,
- a focusing optical system that provides focusing of the said split up beamlets into a specific pattern of focused spots in the working field or on a workpiece, comprising objectives, beam expanders, mirrors, scanners.

Advantageously, the beam splitter is located between the collimator and the focusing optical system.

According to the present invention, angular lossless polarization splitting of a collimated light beam into multiple beamlets is realized using one or more wedge-shaped birefringent prisms made of crystalline materials. These materials are widely-used in science and industry to realize various effects based on the polarization of light. A well-known property of birefringent crystals is the dependence of the refractive index on the reciprocal orientations of the optical axes of the crystals and the polarization planes of light. This physical property is sufficiently described in Born, M. and Wolf, E., Principles of Optics, 7th edn, Cambridge University Press, Cambridge, 1999, p. 678-690; Collett, E., Field Guide to Polarization, SPIE, Bellingham, Wash., 2012, p. 41 (both incorporated by reference).

In a prism made of a birefringent material, different light waves are created by light refraction on prism surfaces; this makes it possible to split up a light beam into separate output beamlets characterized by different angles to the optical axis of the apparatus and the same divergence as the input collimated light beam. A distinctive feature of the birefringent prisms according to the present invention is their implementation in such a way that the optical axis of the crystal of each said prism forms an angle with the ridgeline of its refractive surfaces, and the value of this angle is selected in the range from 0° to approximately 90°, for example angle $\beta_2$ in FIG. 1; this design feature allows providing a pre-determined sharing of energy between the output beamlets and, by further focusing, the pre-determined intensities of focused spots. Advantageously, the prisms have a square, rectangle or round outer shape. Combining of several birefringent prisms or prism groups and rotation of some of these prisms or prism groups allows various geometrical configurations of focused spots to be realized, such as linear, rhombus-shaped, square-shaped, parallelogram-shaped, rectangle-shaped patterns composed in the form of a line or a matrix from 2, 3, 4, 9 and more separate spots, with the ability to vary portions of the light beam energy at the specified separate spots.

Important advantage of the technical solution according to the present invention is the ability of the beam splitting optics to operate in relatively large angular field of view and its practical insensitivity to misalignments, such as lateral displacements and tilts, since the prisms and waveplates of the beam splitter comprise only afocal flat refractive optical surfaces. This ensures easy installation and reliable operation of devices built according to the present invention.

According to the present invention, the change in the energy portions in the split up beamlets and, therefore, varying intensity of separate spots in the working field is realized by the use of one or more waveplates or rotatable waveplates, which change polarization state of the light due to the introduction of a phase front retardation. As sufficiently described in Born, M. and Wolf, E., Principles of Optics, 7th edn, Cambridge University Press, Cambridge, 1999, p. 678-690; Collett, E., Field Guide to Polarization, SPIE, Bellingham, Wash., 2012, p. 41; U.S. Published Patent Application 2006/0198022 to Pan et al; and U.S. Pat. No. 1,926,716 to Ehringhaus (all incorporated by reference), the rotation of the waveplates results in a change in the polarization state of light, just this physical effect is used in the present invention to control and lossless redistribute the energy between the said output split up beamlets.

A distinctive feature of the waveplates according to the present invention is their implementation as dual waveplates, realizing the phase front retardation effect simultaneously at two operating wavelengths; this design feature makes the beam splitter suitable for switching between different laser sources or simultaneous operation with lasers of different wavelengths. Advantageously, the said dual waveplate or waveplates are located between the prisms or prism groups, and the beam splitter comprises at least one rotatable dual waveplate.

According to one embodiment of the present invention, the dual waveplate presents a multi-order half-wave plate providing the half-wave phase front retardation effect simultaneously at two operating wavelengths $\lambda_1$ and $\lambda_2$. The choice of these operating wavelengths depends on a specific application; for example, in the industrial welding, a high power multimode fiber-coupled Yb:YAG solid-state laser with wavelength 1030 nm and a Yb fiber laser with wavelength 1070 nm are widely used; another example from modern welding applications is the combination of two multi-kW multi-mode fiber-coupled diode laser sources operating at wavelengths 450 nm and 980 nm. Referring to Collett, E., Field Guide to Polarization, SPIE, Bellingham, Wash., 2012, p. 41; U.S. Published Patent Application 2006/0198022 to Pan et al; and U.S. Pat. No. 1,926,716 to Ehringhaus (all incorporated by reference), the phase front retardation for the aforementioned dual waveplate of thickness t can be described by formulas $$\Delta n_1 \cdot t = (m_h + k) \cdot \lambda_1 + \frac{\lambda_1}{2}, \qquad (1)$$

$$\Delta n_2 \cdot t = m_h \cdot \lambda_2 + \frac{\lambda_2}{2}, \qquad (2)$$

where $\Delta n_1$ and $\Delta n_2$ are the differences between the refractive indices of an ordinary ray and an extraordinary ray for the birefringent optical material of the dual waveplate, respectively, at wavelengths $\lambda_1$ and $\lambda_2$; $m_h$ is the waveplate order, which is equal to the integer number of complete phase front retardation cycles; k is the difference of the dual waveplate orders at wavelengths $\lambda_1$ and $\lambda_2$. Combining Eqs. (1) and (2) for the same thickness t gives the value of the calculated order $M_h$ of the dual waveplate $$M_h = \frac{k}{\frac{\lambda_2 \cdot \Delta n_1}{\lambda_1 \cdot \Delta n_2} - 1} - \frac{1}{2}. \tag{3}$$

Example: the dual waveplate made of crystalline quartz, $\lambda_1$=1030 nm (Yb:YAG solid-state laser), $\lambda_2$=1070 nm (Yb fiber laser), $\Delta n_1$=approximately 0.008758, $\Delta n_2$= approximately 0.008736, k=1, then computations using Eqs. (3) and (2) give values of the dual waveplate calculated order $M_h$=approximately 23.67 and the thickness of approximately 2.96 mm. Since the waveplate order must be an integer, it can be taken in this example either $m_h$=24, then t=approximately 3.00 mm, or $m_h$=23, then t=approximately 2.88 mm; in both cases, deviations from the conditions of the perfect half-wave phase front retardation at wavelengths $\lambda_1$ and $\lambda_2$ are negligible for engineering practice. Based on this example, the optimal integer value of the order $m_h$ for the dual waveplate is within the range "$M_h \pm 1$", where $M_h$ is the value calculated using Eq. (3).

According to another embodiment of the present invention, the dual waveplate presents a multi-order quarter-wave plate providing the quarter-wave phase front retardation effect simultaneously at two operating wavelengths $\lambda_1$ and $\lambda_2$. As in the previous embodiment, considering the mathematical formulations for quarter-wave plates described in Collett, E., Field Guide to Polarization, SPIE, Bellingham, Wash., 2012, p. 41; U.S. Published Patent Application 2006/0198022 to Pan et al; and U.S. Pat. No. 1,926,716 to Ehringhaus (all incorporated by reference), one can obtain the following formula for calculating the order $M_q$ of the dual waveplate $$M_q = \frac{k}{\frac{\lambda_2 \cdot \Delta n_1}{\lambda_1 \cdot \Delta n_2} - 1} - \frac{1}{4}, \tag{4}$$

where the variables have the same meaning as in the previous embodiment. Basing on the above considered example, the optimal integer value of the order $m_q$ of the dual waveplate is within the range "$M_q \pm 1$", where $M_q$ is the value calculated using Eq. (4).

In yet another embodiment of the present invention, the dual waveplate is implemented as a multi-order waveplate that provides simultaneously the quarter-wave phase front retardation effect at one operating wavelength $\lambda_1$ and the half-wave phase front retardation effect at another operating wavelength $\lambda_2$.

As in the previous embodiments, considering the mathematical formulations for half-wave plates and quarter-wave plates described in Collett, E., Field Guide to Polarization, SPIE, Bellingham, Wash., 2012, p. 41; U.S. Published Patent Application 2006/0198022 to Pan et al; and U.S. Pat. No. 1,926,716 to Ehringhaus (all incorporated by reference), one can obtain the following formula for calculating the order $M_{hq}$ of the dual waveplate $$M_{hq} = \frac{k + \frac{1}{4}}{\frac{\lambda_2 \cdot \Delta n_1}{\lambda_1 \cdot \Delta n_2} - 1} - \frac{1}{4}, \tag{5}$$

where the variables have the same meaning as in the previous embodiments. Basing on the above considered example, the optimal integer value of the order $m_{hq}$ of the dual waveplate is within the range "$M_{hq} \pm 1$", where $M_{hq}$ is the value calculated using Eq. (5).

According to the present invention, the dual waveplate, providing the half-wave or quarter-wave phase front retardation effects simultaneously at two operating wavelengths $\lambda_1$ and $\lambda_2$, can be implemented as a zero-order or a low-order waveplate that presents a combination of two multi-order waveplates, the optical axes of which are orthogonal to each other, and their thicknesses are implemented in such a way that the effect of the multiplicity of full phase front retardation cycles is compensated or minimized. These zero- or low-order waveplates provide the phase front retardation effect in a specific spectrum with performance acceptable in engineering practice; for example, in the spectral range approximately 1000-1100 nm of modern high power lasers used in industrial applications. The aforementioned combination of the high power multimode fiber-coupled Yb:YAG solid-state laser with wavelength 1030 nm and the Yb fiber laser with wavelength 1070 nm can be effectively used, thus enabling simultaneous operation at two different wavelengths $\lambda_1$ and $\lambda_2$. Because of double quantity of optical elements, zero- or low-order waveplates are characterized by higher costs and bigger thickness, which reduces their applicability with modern multi-kW lasers owing to thermally induced optical effects of focus shift and aberrations.

The present invention can be realized by various optical systems, several embodiments will now be described. For clarity of description, it is assumed, as a non-limiting condition, that the light sources are substantially unpolarized; this condition is fulfilled in engineering practice in modern multimode laser, for example, in multimode fiber lasers as well as in multimode fiber coupled solid-state and diode lasers. In the case of linearly polarized or elliptically polarized light, a specifically oriented waveplate or rotation of a light source can be used to optimize the polarization state of light at the entrance of the beam splitter according to the present invention, and thus realize the same beam splitting effect as that in the case of unpolarized light; as non-limiting examples: transformation to circularly polarized light, rotation of the plane of polarization to provide the orientation angle of approximately 45° to the ridgeline of refractive surfaces of the first prism of the beam splitter.

A significant advantage of devices realizing the method according to the present invention is that various non-limiting embodiments comprise only air-spaced optical elements. Thus, neither cemented optics is applied. Consequently, the resistance of the components to laser radiation is determined by properties of optical coatings and polishing grade of optical surfaces. Modern state-off-the-art manufacturing techniques provide high damage thresholds and ensure resistance of devices according to the present invention to powerful laser radiation, especially for widely-used ultra-short pulse lasers and multi-kW continuous wave lasers.

FIG. 1A shows the optical system with a divergent light beam from a laser source, such as a fiber laser or a fiber-coupled laser, the collimator and the focusing optical system implemented as lenses, and the beam splitter consisting of two wedge-shaped prisms W1 and W2 according to the present invention:

the Y and Z axes form the Base plane, a divergent beam Bd is provided by a fiber laser or a fiber-coupled laser, the collimator and the focusing optical system are implemented as lenses, the beam splitter is composed from two wedge-shaped prisms W1 and W2 implemented according to the present invention, the optical axis of the crystal of the wedge-shaped prism W1 is parallel to its front optical surface and to the Base plane, is orthogonal to the optical axis of the apparatus, the optical axis of the crystal of the wedge-shaped prism W2 is parallel to its back optical surface, is orthogonal to the optical axis of the apparatus and forms an angle $\beta_2$ with the Base plane, orientations of the optical axes of the crystals of prisms are indicated by arrows with round ends, as a non-limiting example, the prisms W1 and W2 have the same apex angles, and the ridgelines of their refractive surfaces are parallel to each other, three separate spots, lined up in a row, are created in the working field;

distances between spots are defined by the wedge apex angles of the prisms W1 and W2 and by the focal length of the focusing optical system, for clarity of presentation, ray tracing is shown only for the central rays of the beamlets, also called principal rays.

Obviously, focusing the output beamlets using a lens creates a linear multi-spot pattern: two or more spots of variable intensity lined up in a row.

The energy E of the collimated beam after the collimator is split up between four spots formed by focusing the output beamlets BL1, BL2, BL3 and BL4 in the working field; and the energy portions $E_1$, $E_2$, $E_3$ and $E_4$ can be calculated using the formulas $$E_1 = E_4 = E \cdot \frac{\sin^2 \beta_2}{2}, \quad (6)$$

$$E_2 = E_3 = E \cdot \frac{\cos^2 \beta_2}{2}. \quad (7)$$

The spots formed by focusing the beamlets BL2 and BL3 are brought into coincidence in the central spot on the optical axis of the apparatus, therefore, as result, three working lined up spots are created. Considering Eqs. (6) and (7), the condition of equal energy portions in these three spots $$E_1 = E_2 + E_3 = E_4, \quad (8)$$

as shown in picture Ln3 (a beam profile measurement), is fulfilled when $$\beta_2 = \arccos \frac{1}{\sqrt{3}} = 54{,}73561° \approx 54°44'.$$

The use of different values of the angle $\beta_2$ in the range from 0° to approximately 90° results in different energy sharing between the split up beamlets and, therefore, in different intensities of the focused spots. Non-limiting examples are shown in picture Ln2 with a higher intensity of the central spot and in picture Ln1 with equal intensities of the upper and lower spots and zero intensity in the central spot of the pattern. In the considered implementations of the beam splitter according to FIG. 1A, the energy distributions between the spots of the pattern are fixed for the chosen angle $\beta_2$, however, the distributions can be changed by changing the polarization state of the input beam Bd. A specific energy distribution in a multi-spot pattern depends on the application, for example, the patterns with equal spot intensities in pictures Ln3 and Ln1 allow parallel microprocessing in technologies such as scribing or drilling; the pattern shown in picture Ln2 is optimal for reduction of spatter and porosity by welding.

Figure 1B:
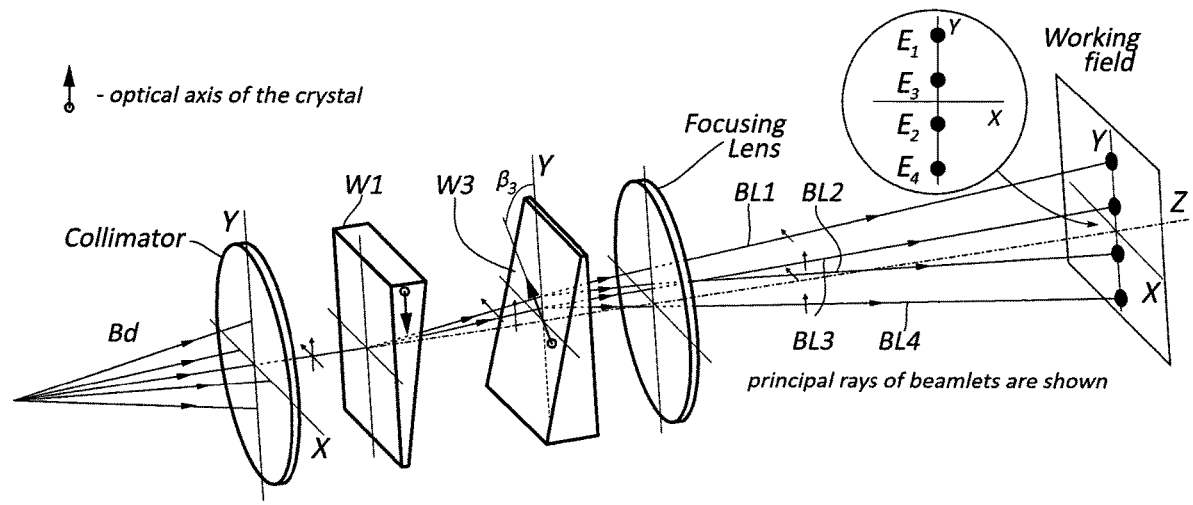
FIG. 1B is a schematic diagram with a beam splitter consisting of two birefringent wedge-shaped prisms with different prism apex angles, providing a linear multi-spot pattern: four spots of equal intensity lined up in a row.

FIG. 1B shows the optical system similar to that of FIG. 1A, with the difference that the beam splitter consists of two wedge-shaped prisms W1 and W3 according to the present invention with different wedge apex angles, as a non-limiting example, the wedge apex angle of the prism W3 is bigger than that of the prism W1. The spots formed by focusing the beamlets BL2 and BL3 are separated; therefore, four separate lined up spots are created. Considering Eqs. (6) and (7) with replacement of the angle $\beta_2$ by the angle $\beta_3$, formed by the optical axis of the crystal of the prism W3 and the vertical axis Y, the condition of equal energy portions in all four spots $$E_1 = E_2 = E_3 = E_4 \quad (9)$$

is fulfilled when $\beta_3$=approximately 45°.

Similar to the above considered optical system of FIG. 1A, implementations of the optical system according to FIG. 1B with different values of the angle $\beta_3$ in the range from 0° to approximately 90° result in different intensities of the focused spots, which are fixed for the chosen angle $\beta_3$, but can be changed by changing the polarization state of the input beam Bd. The setting of a specific energy distribution in the multi-spot pattern depends on the application, for example, the shown in FIG. 1B four-spot pattern with equal spot intensities is optimal for parallel microprocessing.

Figure 2A:
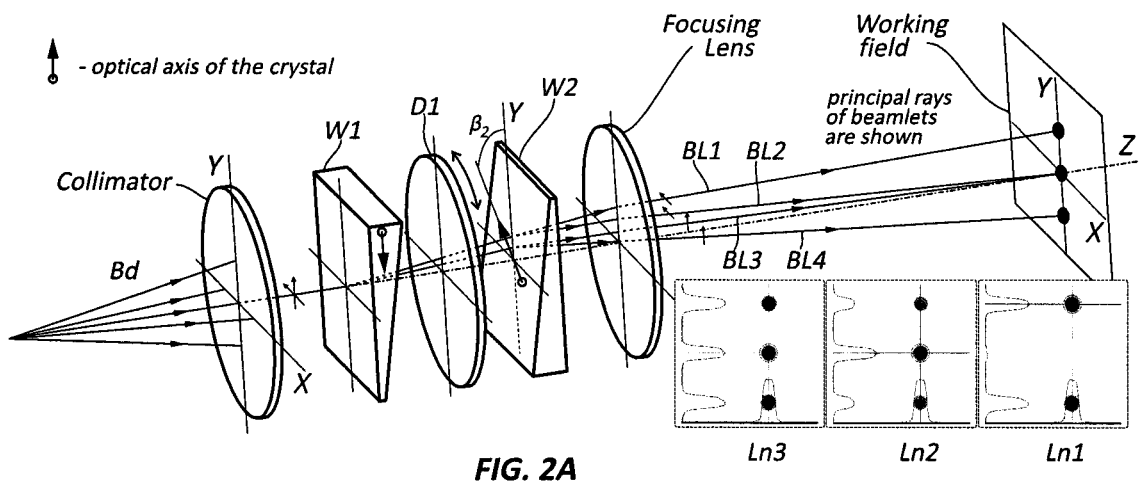
FIG. 2A is a schematic diagram of one embodiment of the present invention with a beam splitter comprising two birefringent wedge-shaped prisms and a rotatable dual waveplate located between the said prisms, providing a linear multi-spot pattern: three or two spots of variable intensity lined up in a row.

One non-limiting embodiment of the present invention is shown in FIG. 2A, it presents an evolution of the previously described optical system according to FIG. 1A by placing a rotatable dual waveplate D1 between the wedge-shaped prisms W1 and W2:

the Y and Z axes form the Base plane, a divergent beam Bd is provided by a fiber laser or a fiber-coupled laser, the collimator and the focusing optical system are implemented as lenses, the beam splitter is composed from two wedge-shaped prisms W1 and W2 according to the present invention and a rotatable dual waveplate D1 between the said prisms, the rotatable dual waveplate D1 is implemented in any of the previously above described embodiments of the present invention, as a non-limiting example, the optical axis of the crystal of the wedge-shaped prism W1 is parallel to its front optical surface and to the Base plane, is orthogonal to the optical axis of the apparatus, the optical axis of the crystal of the wedge-shaped prism W2 is parallel to its back optical surface, is orthogonal to the optical axis of the apparatus and forms an angle $\beta_2$ with the Base plane, orientations of the optical axes of the crystals of prisms are indicated by arrows with round ends, as a non-limiting example, the prisms W1 and W2 have the same apex angles, and the ridgelines of their refractive surfaces are parallel to each other, three separate spots, lined up in a row, are created in the working field, distances between spots are defined by the wedge apex angles of the prisms W1 and W2 and by the focal length of the focusing optical system, for clarity of presentation, ray tracing is shown only for the principal rays of the beamlets.

The two light beamlets, angularly split up by the prism W1, are linearly polarized and have orthogonal polarization planes, which in the considered non-limiting embodiment are vertical and horizontal. The rotation of the dual waveplate D1 around the optical axis of the apparatus results in a change in the polarization states of the beamlets split up by the prism W1 and in the subsequent lossless changeover of the energy portions in beamlets split up by the prism W2, as result, the intensities of the spots in the working field are changed as well. As a non-limiting example: the waveplate D1 provides the half-wave phase front retardation effect simultaneously at two operating wavelengths, its rotation at angle of approximately 15° leads to rotation of the polarization planes of the beamlets, split up by the prism W1, at angle of approximately 30°, as result, the pattern with equal intensities of three lined up spots shown in picture Ln3 (a beam profile measurement) is transformed to the pattern shown in picture Ln2, characterized by greater intensity of the central spot, and further rotation of the waveplate D1 allows reaching the pattern shown in picture Ln1, when the beam energy is lossless split up between the upper and lower spots with zero intensity in the central spot of the pattern.

The rotation of either the prism W1 or the prism W2 around the optical axis leads to transformation of the lined up spots to the rhombus-shaped or square-shaped multi-spot patterns, which are interesting in industrial applications such as welding, Selective Laser Melting. Since the rotation of the prisms W1 or W2 leads also to the unwanted deviation of the multi-spot pattern from the optical axis, it is reasonable in the engineering practice to apply other embodiments of the present invention, for example the technical solution shown below in FIGS. 3A, 3B and 3C.

Obviously, rotating the waveplate D1 is a flexible tool to optimize the spot pattern for a specific application; for example, the patterns with equal spot intensities, shown in pictures Ln3 and Ln1, allow parallel microprocessing in scribing or drilling. The pattern shown in picture Ln2 allows optimizing the dynamic temperature distribution of the melt pool to reduce spatter and porosity by welding: the lower intensity spots at the top and bottom provide pre- and post-heating, while the central high intensity spot melts the workpiece material; and the rotation of the waveplate D1 makes it possible to vary the energy portions in the spots and thus optimize the intensity profile for a particular laser technology.

Figure 2B:
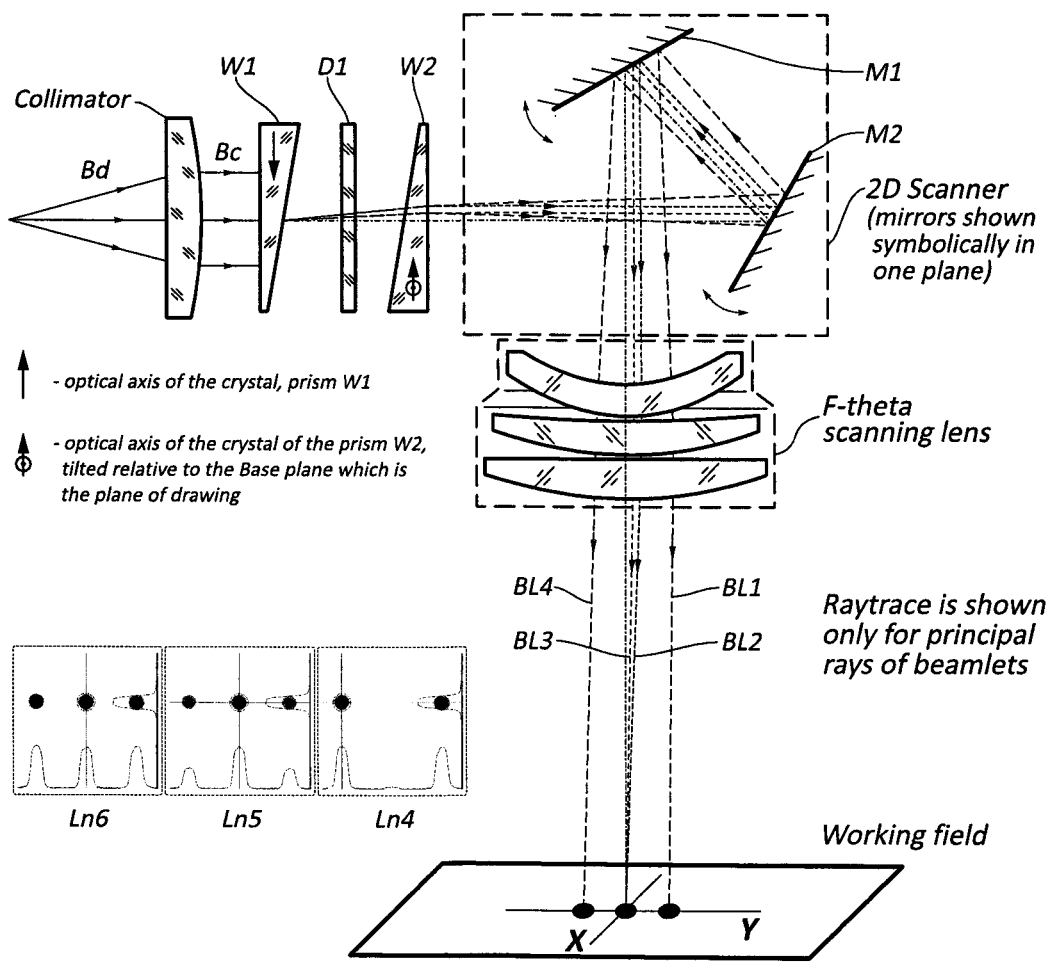
FIG. 2B is a schematic diagram of another embodiment of the present invention with a beam splitter as presented in FIG. 2A and the focusing optical system implemented as a combination of a mirror-based scanner and a scanning lens (F-theta lens), providing a linear multi-spot pattern as three or two lined up spots of variable intensity, and this linear multi-spot pattern is scanned in two dimensions of the working field.

One more non-limiting embodiment of the present invention is shown in FIG. 2B, it presents an evolution of the previously described embodiment according to FIG. 2A by implementing the focusing optical system in form of a scanning optical system comprising a two-dimensional mirror scanner and a scanning lens, as a non-limiting example, an F-theta lens. The scanner is equipped with two mirrors M1 and M2 providing two-dimensional scanning of focused spots in the working field by tilting in orthogonal planes; for illustration purposes, the mirrors M1 and M2 are symbolically shown in the same plane and the ray tracing is shown for the principal rays of the beamlets only. Since the beam splitter, composed from the prisms W1, W2 and the waveplate D1, is the same as in the previous embodiment according to FIG. 2A, the patterns created in the working plane of the scanning lens are two or more spots lined up in a row, as shown in beam profile measurements Ln4, Ln5 and Ln6. When the mirrors M1 and M2 are tilted, the pattern of lined-up spots stays unchanged and is two-dimensionally scanned over the entire working field.

Scanning of the multi-spot patterns shown in this embodiment can also be implemented in other embodiments of the present invention. The scanning technique is a very important tool for high productive processing in laser technologies such as welding, drilling, and scribing. If the optical system of existing laser equipment comprises a scanner and a scanning lens, any of the technical solutions according to the present invention can be embodied by placing the beam splitter in front of the scanner.

Figure 3A:
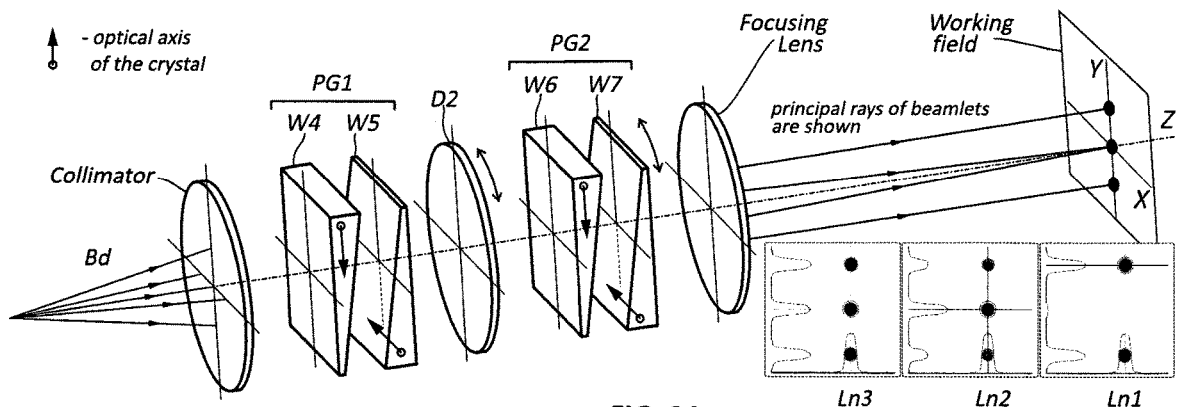
FIGS. 3A, 3B and 3C show schematic diagrams of one more embodiment of the present invention with a beam splitter comprising two groups of birefringent wedge-shaped prisms and a rotatable dual waveplate; one of the prism groups is rotatable, its settings for providing the linear, rhombic and square-shaped multi-spot patterns are respectively shown in FIGS. 3A, 3B and 3C.
Figure 3B:
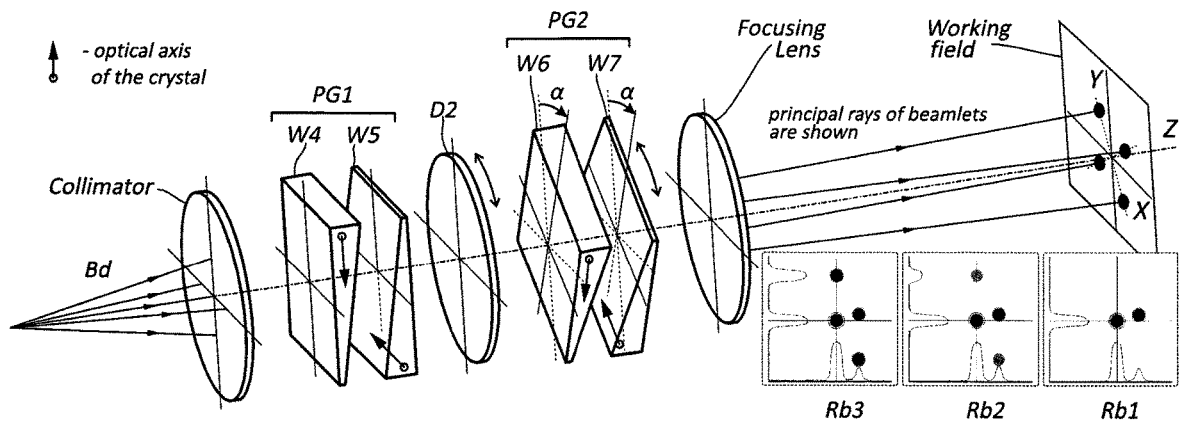
Figure 3C:
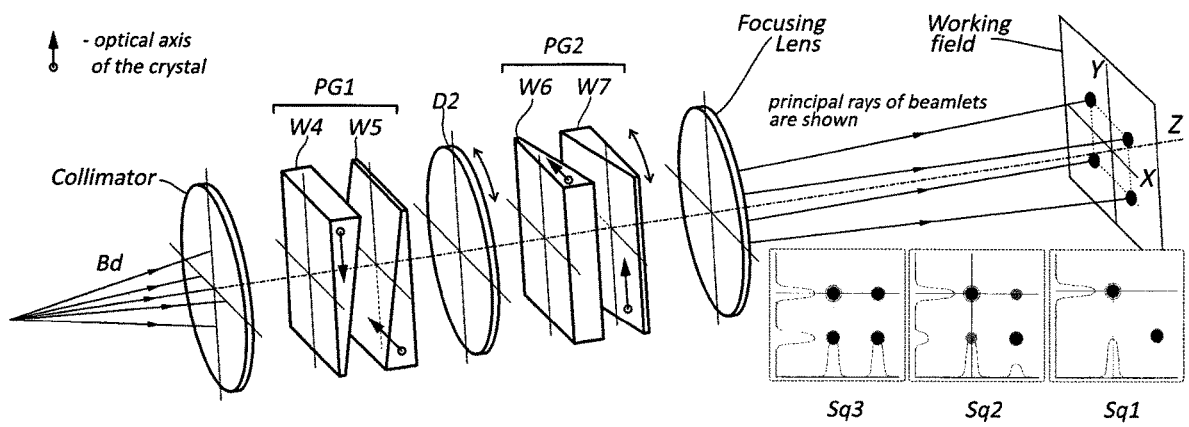

Another non-limiting embodiment of the present invention is shown in FIGS. 3A, 3B and 3C as schematic diagrams with different settings of the beam splitter. This technical solution can be considered as an evolution of the previously described embodiment shown in FIG. 2A by implementing components of the beam splitter in form of prism groups PG1 and PG2 and a rotatable dual waveplate D2:

the Y and Z axes form the Base plane, a divergent beam Bd is provided by a fiber laser or a fiber-coupled laser, the collimator and the focusing optical system are implemented as lenses, the beam splitter is composed from two prism groups PG1 and PG2 and a rotatable dual waveplate D2 between the said prism groups, the prism group PG1 consists of two wedge-shaped birefringent prisms W4 and W5, implemented according to the present invention in such a way that the optical axis of the crystal forms an angle in the range from 0° to approximately 90° with the ridgeline of the prism refractive surfaces; the orientations of the optical axes of the crystals of the prisms are indicated by arrows with round ends, as a non-limiting example, the prisms W4 and W5 have the same apex angles, and the ridgelines of their refractive surfaces are parallel to each other, the front refractive surface of the prism W4 and the rear refractive surface of the prism W5 are perpendicular to the optical axis of the apparatus, the rear refractive surface of the prism W4 and the front refractive surface of the prism W5 are parallel to each other and inclined relative to the optical axis of the device; then, the beamlets split up by the prism group PG1 are characterized by the minimal deviation from the optical axis of the device, the prism group PG2 consists of two wedge-shaped birefringent prisms W6 and W7; design of the PG2 is similar to that of the PG1, designs of the prisms W6 and W7 are similar to respective designs of the prisms W4 and W5, the rotatable dual waveplate D2 is implemented in any of the previously described designs of the present invention; its rotation is used to vary intensities of spots in the multi-spot pattern in the working field, the prism group PG2 is rotatable around the optical axis of the device; its rotation is used to vary the geometrical shape of the multi-spot pattern in the working field, the created multi-spot pattern consists of four separate spots, rotation of the prism group PG2 around the optical axis at different angles α from the Base plane results in a change in the geometrical shape of the multi-spot pattern, as non-limiting examples:

α=0°, FIG. 3A—line-shaped: two or more spots of even or variable intensity lined up in a row, 0°<α<approximately 90°, FIG. 3B—rhombus-shaped: four spots of even or variable intensity, which centers coincide with the vertices of a rhombus, α=approximately 90°, FIG. 3C—square-shaped: four spots of even or variable intensity, which centers coincide with the vertices of a square, distances between spots are defined by the wedge apex angles of the prisms W4, W5, W6, and W7, by the focal length of the focusing optical system and by the angle α of rotation of the prism group PG2, when the geometric shape of the multi-spot pattern is specified by the angular setting of the prism group PG2, the rotation of the waveplate D2 is used to vary the intensities of separate spots of the said patterns, rotations of the prism group PG2 and the waveplate D2 result in lossless transformation of the multi-spot pattern, for clarity of presentation, ray tracing is shown only for the principal rays of the beamlets.

The two light beamlets, angularly split up by the prism group PG1, are linearly polarized and have orthogonal polarization planes, which in the considered non-limiting embodiment are vertical and horizontal. The rotation of the dual waveplate D2 around the optical axis of the apparatus results in a change in the polarization states of the beamlets split up by the prism group PG1, and in a subsequent lossless change of the energy portions in the beamlets split up by the prism group PG2, as result, the intensities of the spots in the working field are changed as well. As a non-limiting example shown in FIG. 3A, the waveplate D2 provides the half-wave phase front retardation effect simultaneously at two operating wavelengths, its rotation at angle of approximately 15° leads to approximately 30° rotation of the polarization planes of the beamlets split up by the prism group PG1, as result, the pattern with equal intensities at three lined up spots shown in picture Ln3 (a beam profile measurement) is transformed to the pattern with high intensity of the central spot shown in picture Ln2, and further rotation of the waveplate D2 allows reaching the pattern shown in picture Ln1, when the beam energy is lossless split up between the upper and lower spots with zero intensity in the central spot.

Rotation of the prism group PG2 around the optical axis of the device results in a change in the geometrical shape of the multi-spot pattern. As a non-limiting example, shown in FIG. 3B, rotation of the prism group PG2 at angle α=approximately 30° from the Base plane (α=0°) leads to transformation of the spots lined up in a row to the rhombus-shaped four-spot pattern. Owing to rotation of the prism group PG2, the optical axes of the crystals of the wedge-shaped prisms W6 and W7 rotate as well, and this leads to a change in the energy distribution between the beamlets split up by the prism group PG2, and to a subsequent variation of intensities of the spots in the working field. The correction and intentional change in the energy distribution between the beamlets are performed by rotating the dual waveplate D2, which leads to a change in the polarization states of the beamlets split up by the prism group PG1, and to a subsequent change in the energy portions in beamlets split up by the rotated prism group PG2. Since the waveplate D2 provides the half-wave phase front retardation effect simultaneously at two operating wavelengths, its rotation at angle of 7.5° leads to 15° rotation of the polarization planes of the beamlets split up by the prism group PG1; as result, the pattern with equal intensities in four rhombus-shaped spots, corresponding to the initial setting of the waveplate D2 and shown in picture Rb3 (a beam profile measurement), is transformed to the pattern shown in picture Rb2, characterized by two close located spots at the vertices of the short diagonal of the rhombus. Further rotation of the waveplate D2 allows reaching the pattern shown in picture Rb1, when the beam energy is lossless split up between two spots at the vertices of the rhombus short diagonal; the spots at the vertices of the rhombus long diagonal are of zero intensity.

Further rotation of the prism group PG2 at angle α=approximately 90° from the Base plane (α=0°) transforms the geometric shape of the multi-spot pattern into a square, FIG. 3C, when four spots are located at the square vertices. As in previously described example shown in FIG. 3B, the rotation of the prism group PG2 and, therefore, the rotation of the optical axes of the crystals of the wedge-shaped prisms W6 and W7 leads to a change in the energy distribution between the beamlets split up by the prism group PG2, and to a subsequent variation of intensities of the spots in the working field.

The correction, as well as the intentional variation of the energy distribution between the beamlets are performed by rotation of the dual waveplate D2 leading to a change in the polarization states of the beamlets split up by the prism group PG1, and to a subsequent change in the energy portions in beamlets split up by the rotated prism group PG2. In the non-limiting example shown in FIG. 3C, the initial setting of the waveplate D2 is chosen in such a way that all four separate spots of the square-shaped multi-spot pattern have the equal intensity, picture Sq3 (a beam profile measurement). An approximately 7.5° rotation of the waveplate D2 results in an approximately 15° rotation of the polarization planes of the beamlets split up by the prism group PG1 and in subsequent transformation into the multi-spot pattern shown in picture Sq2, when spots of one diagonal have a higher intensity than the spots of the other diagonal. Further rotation of the waveplate D2 transforms the spot pattern into that shown in picture Sq1, when the beam energy is lossless split up between two spots at the vertices of one of the square diagonals.

Obviously, the independent rotations of the prism group PG2 and the waveplate D2 are flexible tools to optimize the spot pattern for a specific application. For example, the patterns with equal spot intensities, shown in pictures Ln3, Ln1, Sq3 and Sq1, allow realizing parallel microprocessing such as drilling. The rhombus-shaped pattern in picture Rb2 is very important for welding: the lower intensity spots in the long diagonal provide pre- and post-heating, while the two central closely located spots of high intensity melt the workpiece material; these closely located central spots, called also "twin-spots", increase the lateral tolerance of positioning the combined multi-spot pattern with respect to the junction line of the welded parts. Thus, the use of the pattern Rb2 makes it possible to optimize welding conditions by controlling the dynamic distribution of temperature in the melt pool and reducing the requirements for positioning accuracy, which results in more stable welding process, characterized by the eliminated or minimized spatter and low porosity.

Figure 4:
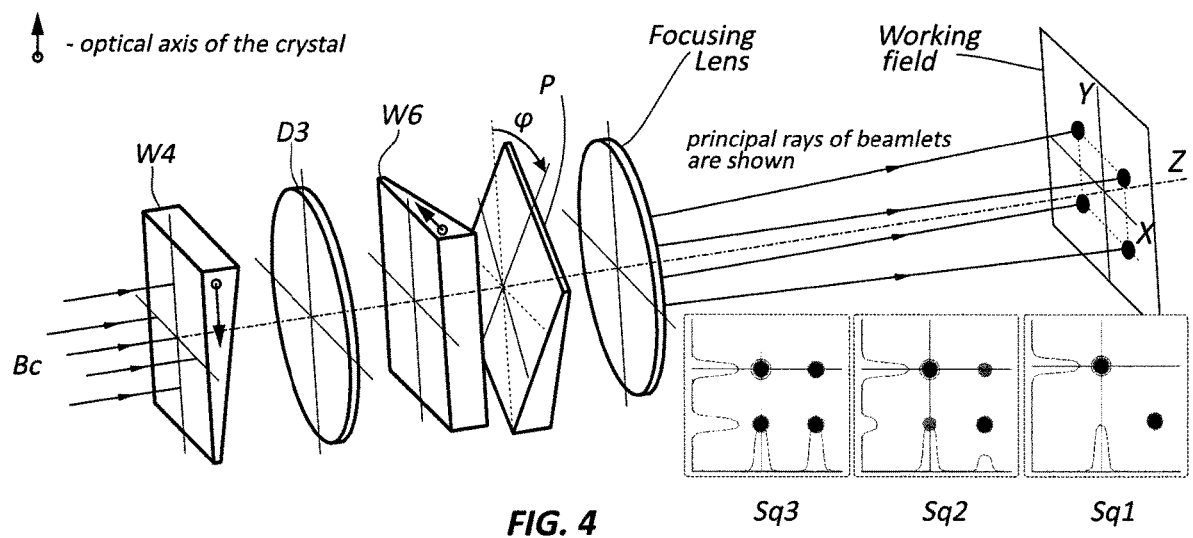
FIG. 4 is a schematic diagram of another embodiment of the present invention with a beam splitter comprising two birefringent wedge-shaped prisms, a rotatable dual waveplate and a prism from isotropic refractive optical material to minimize deviation of the multi-spot pattern from the optical axis; providing a square-shaped multi-spot pattern with variable spots intensity.

One more non-limiting embodiment of the present invention is shown in FIG. 4 as a schematic diagram. In this technical solution, the beam splitter is equipped with a wedge-shaped prism P correcting the orientation of split up beamlets with respect to the optical axis of the apparatus:

the Y and Z axes form the Base plane, a collimated beam Bc is provided by a free space laser, this can be also a beam after a beam expander, the focusing optical system is implemented as a lens, the beam splitter consists of two wedge-shaped birefringent prisms W4 and W6, a rotatable dual waveplate D3 between the said prisms and a wedge-shaped prism P made of isotropic optical material, the wedge-shaped prism P is the last optical element of the beam splitter, its design parameters, such as the prism apex angle, the angle of rotation φ, provide minimization of the deviation of the multi-spot pattern from the optical axis of the device, particularly aligning the center of the pattern with the axis Z, as a non-limiting example, the prisms W4 and W6 have the same apex angles, and the ridgelines of their refractive surfaces are orthogonal to each other, the front refractive surface of the prism W4 and the rear refractive surface of the prism W6 are perpendicular to the optical axis of the device, the rotatable dual waveplate D3 provides the quarter-wave phase front retardation effect simultaneously at two operating wavelengths, its rotation is used to vary intensities of spots in the multi-spot pattern in the working field, the square-shaped multi-spot pattern, created by the lossless beam splitting, consists of four separate spots of equal or variable intensity, the centers of which coincide with the vertices of a square, the distances between the spots are determined by the apex angles of the prisms W4 and W6, as well as by the focal length of the focusing optical system, for clarity of presentation, ray tracing is shown only for the principal rays of the beamlets.

The angle φ of rotation of the prism P about the optical axis depends on the apex angles of the prisms W4 and W6. In the non-limiting example of building a square shaped pattern shown in FIG. 4, the apex angles of the prisms W4 and W6 are equal, then the optimum rotation angle φ=approximately 45°. In the case of a rectangular multi-spot pattern, the apex angles of the prisms W4 and W6 are different; then the value of the rotation angle φ-is chosen in such a way that the ridgeline of the refractive surfaces of the prism P is orthogonal to one of the diagonals of the said rectangular multi-spot pattern.

Since the function of the prism P is minimizing the deviation of the multi-spot pattern from the optical axis of the device, the value of the apex angle of the prism P depends on the apex angles of the prisms W4 and W6. Considering the above example of the square-shaped pattern due to equal apex angles of the prisms W4 and W6 and, as a non-limiting example, assuming that the refractive indices of optical materials of all prisms are close to each other, one can get that the apex angle of the prism P to be approximately $\sqrt{2}$ times larger than that of the prisms W4 and W6; for example, these conditions are fulfilled when the birefringent prisms W4 and W6 are made of crystalline quartz, and the prism P is made of optical glass LLF1 (Schott). In engineering practice of developing particular optical systems, the design parameters of prisms made of different optical materials can be defined numerically using optical design software.

The two light beamlets, angularly split up by the prism W4, are linearly polarized and have orthogonal polarization planes, which in the considered non-limiting embodiment are vertical and horizontal. The rotation of the dual waveplate D3 around the optical axis of the device results in a change in the polarization states of the beamlets split up by the prism W4 and in a subsequent lossless change in the energy portions in beamlets split up by the prism W6, as result, the intensities of the spots in the working field are changed as well. In the non-limiting example shown in FIG. 4, the initial setting of the waveplate D3 is chosen in such a way that all four separate spots of the square-shaped multi-spot pattern have equal intensity, picture Sq3 (a beam profile measurement). Rotating the waveplate D3 transforms the linearly polarized light of the beamlets split up by the prism W4 into light with elliptical or circular polarization and leads to subsequent lossless transformation of the multi-spot pattern to the view shown in picture Sq2, when the spots of one diagonal have higher intensity than the spots of the other diagonal. Further rotation of the waveplate D3 transforms the spot pattern into the pattern shown in picture Sq1, when the beam energy is lossless split up between two spots at the vertices of one of the square diagonals.

Obviously, rotation of the waveplate D3 is a flexible tool to optimize the spot pattern for a specific application. For example, the patterns with equal spot intensities, shown in pictures Sq3 and Sq1, enable parallel microprocessing such as drilling. Considering the focal plane of the focusing optical system, the pattern Sq3 is characterized by zero intensity at the center; owing to defocusing of the working field, this pattern can be transformed into a common spot with minimum intensity in the center or into a flat-top common spot; these multi-spot patterns can be used to optimize processing conditions in cladding, Selective Laser Melting, some types of welding to reduce spattering, porosity and improve the process stability.

Figure 5:
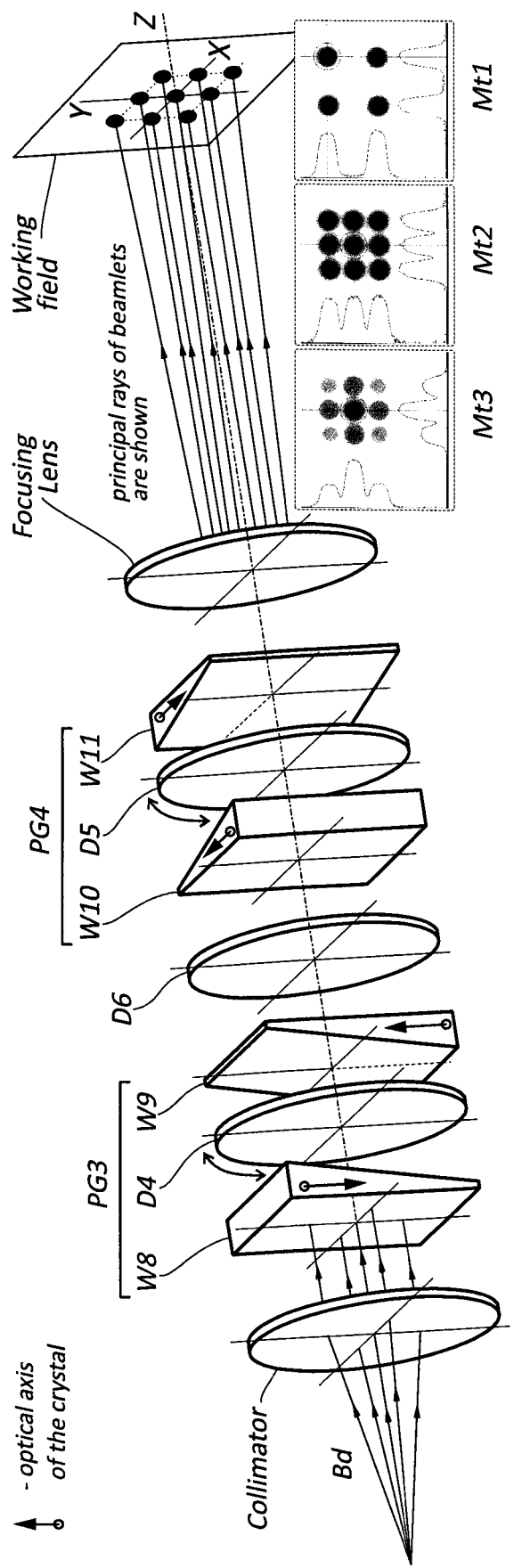
FIG. 5 is a schematic diagram of another embodiment of the present invention with a beam splitter including a dual waveplate and two prism groups comprising wedge-shaped prisms and an inner rotatable dual waveplate between these prisms; there is provided a square-shaped multi-spot pattern in form of a 3×3 matrix of spots with variable spots intensity.

One more non-limiting embodiment of the present invention is shown in FIG. 5 as a schematic diagram. This technical solution is similar to the previously described embodiment shown in FIG. 3C, with the distinctive feature that the prism groups PG3 and PG4 of the beam splitter comprise rotatable dual waveplates D4 and D5 between the prisms:

the Y and Z axes form the Base plane, a divergent beam Bd is provided by a fiber laser or a fiber-coupled laser, the collimator and the focusing optical system are implemented as lenses, the beam splitter is composed from two prism groups PG3 and PG4 according to the present invention and a rotatable dual waveplate D6 between the said prism groups, the prism group PG3 consists of two wedge-shaped birefringent prisms W8, W9 and a rotatable dual waveplate D4 between the said prisms;

the prisms W8 and W9 are implemented according to the present invention in such a way that the optical axis of the crystal forms an angle in the range from 0° to approximately 90° with the ridgeline of the prism refractive surfaces; the orientations of the optical axes of the crystals of the prisms are indicated by arrows with round ends, as a non-limiting example, the waveplate D4 provides the half-wave phase front retardation effect simultaneously at two operating wavelengths, its rotation is used to vary the energy portions in the beamlets split up by the prism group PG3, as a non-limiting example, the prisms W8 and W9 have the same wedge apex angles, and the ridgelines of their refractive surfaces are parallel to each other, the front refractive surface of the prism W8 and the rear refractive surface of the prism W8 are perpendicular to the optical axis of the device, the prism group PG4 consists of two wedge-shaped birefringent prisms W10, W11 and a rotatable dual waveplate D5 between the said prisms; the design of the PG4 is similar to that of the PG3, the designs of the prisms W10 and W11 are similar to the respective designs of the prisms W8 and W9, the design of the waveplate D5 is similar to the design of the waveplate D4, the rotatable dual waveplate D6 is located between the prism groups PG3 and PG4 and implemented in any of the previously described designs of the present invention; its rotation is used to vary intensities of the spots in the multi-spot pattern in the working field, particularly, to correct the symmetry of the multi-spot pattern in the working field, the prism group PG4 is rotated around the optical axis of the device; its rotation is used to vary the geometric shape of the multi-spot pattern in the working field, in total, the optical system forms sixteen spots; some of the spots overlap, therefore the resulting multi-spot pattern consists of nine separate spots arranged in a 3×3 matrix, rotation of the prism group PG4 around the optical axis at different angles from the Base plane results in different geometric shapes of the multi-spot pattern:
line-shaped: two or more spots of equal or variable intensity lined up in a row,
rhombus-shaped matrix of nine spots of equal or variable intensity,
square-shaped matrix of nine spots of equal or variable intensity, examples of these multi-spot patterns are shown in pictures (beam profile measurements) Mt1, Mt2 and Mt3 in FIG. 5, the distances between the spots are determined by the wedge apex angles of the prisms W8, W9, W10, and W11, the focal length of the focusing optical system and the angle of rotation of the prism group PG4, when the geometric shape of the multi-spot pattern is set by the angular setting of the prism group PG4, the waveplates D4 and D5 are rotated either at different angles, or synchronously at the same angle to vary the intensities of separate spots of the said pattern, for clarity of presentation, ray tracing is shown only for the principal rays of the beamlets.

Consider operation of the prism group PG3. The two light beamlets, angularly split up by the prism W8, are linearly polarized and have orthogonal polarization planes, which in the considered non-limiting embodiment are vertical and horizontal. The rotation of the dual waveplate D4 around the optical axis of the device results in a change in the polarization states of the beamlets split up by the prism W8 and a subsequent lossless change in the energy portions of the beamlets split up by the prism W9. In the case of the considered embodiment of the present invention with equal apex angles of the prism W8 and W9, the input beam is split up into 3 beamlets with different angles to the optical axis, and the energy portions in these beamlets are lossless varied by rotation of the dual waveplate D4.

Owing to the design features of the considered embodiment of the invention, the prism group PG4 operates similarly to the prism group PG3. The prism group PG4 can be rotated around the optical axis of the apparatus at an angle ranging from 0° to 90°. As a non-limiting example, shown in FIG. 5, the prism group PG4 is rotated at approximately 90° with respect to the prism group PG3, therefore, each beamlet after the prism group PG3 is split up by the prism group PG4 into 3 beamlets; in total, nine beamlets with different angles to the optical axis are created, and further focusing using the focusing lens results in the pattern in form of a square shaped 3×3 matrix of separate spots in working plane of the device.

As a non-limiting example, the waveplate D6 provides the half-wave phase front retardation effect simultaneously at two operating wavelengths, its rotation leads to rotation of the polarization planes of the beamlets split up by the prism group PG3 and is used to optimize the polarization state of these beamlets for further splitting up by the prism group PG4. As another non-limiting example, the waveplate D6 provides the quarter-wave phase front retardation effect simultaneously at two operating wavelengths. Its rotation leads to transformation of the linearly polarized light of the beamlets split up by the prism group PG3 into elliptically or circularly polarized light, which changes the energy portions in the beamlets when the light is split up by the prism group PG4.

In general, the rotations of the waveplates D4, D5 and D6 are independent and can be performed at different angles to provide different energy distributions between the separate spots of the 3×3 matrix pattern in the working field. Synchronous rotation of the waveplates D4 and D5 at the same angle ensures that the symmetry of the multi-spot pattern is preserved; this operation mode is illustrated by the pictures (beam profile measurements) in FIG. 5: the pattern with even intensities of all nine spots in picture Mt2 is transformed by the waveplates rotation in one direction to the pattern in picture Mt3 with a high intensity central spot or, by the rotation in the opposite direction, to the square-shaped pattern in picture Mt1, when the light energy is lossless split up in four corner spots.

Obviously, the independent rotations of the prism group PG4 and the waveplates D4, D5 and D6 are flexible tools to optimize the spot pattern for a specific application. For example, the patterns with equal spot intensities, shown in pictures Mt2 and Mt1 in FIG. 5, enable parallel microprocessing such as drilling; by defocusing of the working field these pattern are transformed to a flat-top square-shaped common spot, which is optimum in industrial laser applications such as welding, cladding, hardening, peening. The pattern shown in picture Mt3 is important for welding: the spots of lower intensity provide pre- and post-heating, while the high intensity central spot melts the workpiece material; the variable sharing of energy between the central spot and the surrounding lower intensity spots allows optimizing welding conditions by controlling the dynamic distribution of temperature in the melt pool to reduce or minimize the spatter and porosity and stabilize the welding technology.

Rotation of the prism group PG4 with respect to the prism group PG3 at other than approximately 90° angles leads to the transformation of the 3×3 matrix pattern from square-shaped to rhombus-shaped one. As a non-limiting example, when the PG4 is rotated at approximately 60° with respect to the PG3, the settings of the waveplates D4, D5 and D6 can be chosen in such a way that the multi-spot pattern has the hexagonal shape, consisting of seven separate spots with a central high intensity spot surrounded by the six spots of lower intensity. This multi-spot pattern is optimum for some types of laser welding and cutting industrial applications.

The term "approximately"/"approximate" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An optical apparatus for formation of multiple light spots with controlled spot intensity and variable geometry of the multi-spot pattern, the apparatus adapted to receive light from a light source and comprising in order along a light path:
   an input optical system generating an input collimated light beam with a minimized divergence from the light source,
   a beam splitter that implements angular polarization splitting of said collimated light beam, the beam splitter comprising one or more birefringent wedge-shaped prisms made of crystalline materials and implemented in such a way that the optical axis of the crystal of each said prism forms an angle with the ridgeline of its refractive surfaces, and the angle value is in a range from 0° to approximately 90°,
      the said birefringent wedge-shaped prisms being installed in the beam splitter as separate optical elements or in prism groups,
      the collimated light beam is split into two or more separate output beamlets characterized by different angles to the optical axis of the apparatus and same divergence as the input collimated light beam,
      the said beam splitter further comprises at least one rotatable dual waveplate realizing the phase front retardation effect simultaneously at two operating wavelengths, and its rotation is used to control the energy sharing of the input collimated light beam between the said output split beamlets,
      the said beam splitter further includes at least one rotatable birefringent wedge-shaped prism or a prism group, the rotation of which is used to control the geometry of the pattern of multiple spots, and
   a focusing optical system for focusing the said split beamlets in the multi-spot pattern in a working field of a selected application or on a workpiece.

2. The apparatus according to claim 1, wherein the light source is selected from one of: a fiber laser, or a fiber-coupled laser, which are characterized by a divergent light beam, and the optical system, providing the collimated light beam with a minimized divergence, is implemented by an optical collimator.

3. The apparatus according to claim 1, wherein the light source includes a laser with a collimated beam, and the optical system, providing the collimated light beam with a minimized divergence, is implemented by a telescopic beam expander.

4. The apparatus according to claim 1, wherein optical elements of the beam splitter, the birefringent wedge-shaped prisms and dual waveplates, are air-spaced with one another.

5. The apparatus according to claim 1, wherein the beam splitter comprises a wedge-shaped prism made of isotropic refractive optical material, which function is correction of orientation of the split beamlets to minimize deviation of the multi-spot pattern from the optical axis of the apparatus.

6. The apparatus according to claim 1, wherein each birefringent wedge-shaped prism of the beam splitter is implemented in such that an angle formed by the optical axis of the crystal with the ridgeline of the prism refractive surfaces provides distribution of energy between the said multiple spots determined by a specific application.

7. The apparatus according to claim 1, wherein the beam splitter comprises at least one dual waveplate realizing a half-wave phase front retardation effect simultaneously at two operating wavelengths $\lambda_1$ and $\lambda_2$.

8. The apparatus according to claim 1, wherein the beam splitter comprises at least one dual waveplate realizing a quarter-wave phase front retardation effect simultaneously at two operating wavelengths $\lambda_1$ and $\lambda_2$.

9. The apparatus according to claim 1, wherein the beam splitter comprises at least one dual waveplate realizing simultaneously a quarter-wave phase front retardation effect at one operating wavelength $\lambda_1$ and a half-wave phase front retardation effect at another operating wavelength $\lambda_2$.

10. The apparatus according to claim 1, wherein one or more dual waveplates of the beam splitter are multi-order waveplates.

11. The apparatus according to claim 1, wherein one or more dual waveplates of the beam splitter are zero-order waveplates.

12. The apparatus according to claim 1, wherein the beam splitter comprises prism groups with birefringent wedge-shaped prisms and dual waveplates located between the birefringent wedge-shaped prisms.

13. The apparatus according to claim 1, wherein the focusing optical system for focusing the split beamlets includes a scanning optical system comprising a mirror-based scanner and a scanning lens.

14. The apparatus according to claim 1, wherein settings of the rotatable dual waveplate or dual waveplates, as well as of the rotatable birefringent wedge-shaped prism or prism group provide a linear multi-spot pattern: two or more spots of variable intensity lined up in a row.

15. The apparatus according to claim 1, wherein settings of the rotatable dual waveplate or dual waveplates, as well as of the rotatable birefringent wedge-shaped prism or prism group provide a square-shaped multi-spot pattern: four spots of even or variable intensity, which centers coincide with the vertices of a square.

16. The apparatus according to claim 1, wherein settings of the rotatable dual waveplate or dual waveplates, as well as of the rotatable birefringent wedge-shaped prism or prism group provide a rhombus-shaped multi-spot pattern: four spots of even or variable intensity, which centers coincide with the vertices of a rhombus.

17. The apparatus according to claim 1, wherein settings of the rotatable dual waveplate or dual waveplates, as well as of the rotatable birefringent wedge-shaped prism or prism group provide a multi-spot pattern arranged in a square-shaped or rhombus-shaped matrix with more than four spots of even or variable intensity.

18. A method for forming multiple light spots with controlled spot intensity and variable geometry of the multi-spot pattern, comprising the steps of:
  generating a collimated light beam with a minimized divergence from a light source;
  splitting said collimated light beam into two or more beamlets characterized by different angles to the optical axis and the same divergence like the input collimated light beam with a beam splitter having one or more birefringent wedge-shaped prisms made of crystalline materials and implemented in such a way that the optical axis of the crystal of each said prism forms an angle with the ridgeline of its refractive surfaces, and the angle value is in a range from 0° to approximately 90°,
the said birefringent wedge-shaped prisms are installed in the beam splitter as separate optical elements or composed in prism groups;
  transforming the polarization state of the said split beamlets using one or more dual waveplates realizing the phase front retardation effect simultaneously at two operating wavelengths, and rotation of the said dual waveplate is used to control the sharing of the energy of the input collimated light beam between orthogonal polarization planes of the said split beamlets;
  splitting each of the said split and transformed beamlets into two or more separate output beamlets characterized by different angles to the optical axis and the same divergence like the input collimated light beam by another beam splitter having at least one rotatable birefringent wedge-shaped prism or a prism group, the rotation of which is used to control the geometry of the pattern of multiple spots, and
  focusing the said separate output split beamlets in a multi-spot pattern in a working field in a specific application or on a workpiece.

19. The method of claim 18, further comprising the steps of:
  providing air-space between optical elements of the beam splitter, the birefringent wedge-shaped prisms and the dual waveplates, with one another.

20. A method for forming multiple matrix arranged light spots with controlled spot intensity and variable geometry of a multi-spot pattern, comprising the steps of:
  generating a collimated light beam with a minimized divergence from a light source;
  splitting said collimated light beam into two or more beamlets characterized by different angles to the optical axis and same divergence as the collimated light beam with a prism group consisting of two or more birefringent wedge-shaped prisms and a rotatable dual waveplate between the said prisms,
the said prisms are made of crystalline materials and implemented in such a way that the optical axis of the crystal of each of said prisms forms an angle with the ridgeline of its refractive surfaces, and the angle value is in a range from 0° to approximately 90°,
the said dual waveplate is implemented to realize the phase front retardation effect simultaneously at two operating wavelengths, and its rotation is used to control the sharing of the energy of the input collimated light beam between the said split beamlets;
  transforming the polarization state of the said split beamlets using one or more dual waveplates being located after the said prism group and realizing the phase front retardation effect simultaneously at two operating wavelengths, and rotation of the said dual waveplate or waveplates is used to control the sharing of the energy between orthogonal polarization planes of the said split beamlets;
  splitting each of the said split and transformed beamlets into two or more separate output beamlets characterized by different angles to the optical axis and the same divergence like the input collimated light beam by the second prism group consisting of two or more birefringent wedge-shaped prisms and a rotatable dual waveplate between the said prisms, the said prisms are made of crystalline materials and implemented in such a way that the optical axis of the crystal of each of said prisms forms an angle with the ridgeline of its refractive surfaces, and the angle value is in a range from 0° to approximately 90°,
the said dual waveplate is implemented to realize the phase front retardation effect simultaneously at two operating wavelengths, and its rotation is used to control the sharing of the energy of the input collimated light beam between the said separate output beamlets,
  rotating the second prism group to control the geometry of the matrix arranged pattern of multiple spots, advantageously to implement sequentially square-shaped, rhombus-shaped and line-shaped patterns, and
  focusing the said separate output split beamlets in a matrix arranged multi-spot pattern in a working field in a specific application or on a workpiece.

* * * * *